United States Patent
Ezechias et al.

(10) Patent No.: US 12,510,138 B2
(45) Date of Patent: Dec. 30, 2025

(54) GEAR ARRANGEMENT AS WELL AS ROBOT WITH GEAR ARRANGEMENT

(71) Applicant: NEURA ROBOTICS GMBH, Metzingen (DE)

(72) Inventors: Josef Ezechias, Herrenberg (DE); Jannik Göz, Albstadt (DE); David Reger, Metzingen (DE)

(73) Assignee: NEURA ROBOTICS GMBH, Metzingen (DE)

( * ) Notice: Subject to any disclaimer, the term of this patent is extended or adjusted under 35 U.S.C. 154(b) by 0 days.

(21) Appl. No.: 18/378,756

(22) Filed: Oct. 11, 2023

(65) Prior Publication Data

US 2024/0117861 A1    Apr. 11, 2024

(30) Foreign Application Priority Data

Oct. 11, 2022    (DE) .......................... 102022126377.0

(51) Int. Cl.
  *B25J 9/10*    (2006.01)
  *F16H 19/08*    (2006.01)

(52) U.S. Cl.
  CPC .............. *F16H 19/08* (2013.01); *B25J 9/102* (2013.01); *F16H 2019/085* (2013.01)

(58) Field of Classification Search
  CPC ...... B25J 9/1045; B25J 9/104; B25J 17/0241; B25J 9/102; F16H 2019/0677; F16H 19/0672; F16H 19/005; F16H 2019/085; F16H 19/08
  See application file for complete search history.

(56) References Cited

U.S. PATENT DOCUMENTS

| 2,854,854 A | 10/1958 | Rappaport et al. |
| 12,007,002 B2 * | 6/2024 | Ishikawa ................. F16H 19/06 |

FOREIGN PATENT DOCUMENTS

| DE | 102021119527 B3 | 12/2022 |
| JP | S60263761 A | 12/1985 |
| NL | 1003704 C1 * | 2/1998 |
| WO | 2018/086393 A1 | 5/2018 |
| WO | 2022/148705 A1 | 7/2020 |

* cited by examiner

*Primary Examiner* — Gregory Robert Weber
(74) *Attorney, Agent, or Firm* — Nath, Goldberg & Meyer; Jerald L. Meyer; Stanley N. Protigal

(57) ABSTRACT

A gear arrangement (14, 14a) suitable for use in an articulated robot arm is configured with a drive body (16, 16a) with at least one drive-side drum (20, 22) arranged rotatably about a drive axis (18, 18a), and a drive output body (24, 24a) with at least one output-side drum (28, 30) arranged rotatably about a drive output axis (26, 26a). At least one cable (32, 38) is provided, and can be wound on the at least one drive-side drum (20, 22) as well as on the at least one output-side drum (28, 30), and has a drive-side cable end (34, 40) as well as an output-side cable end (36, 42). The drive-side cable end (34, 40) is arranged on the at least one drive-side drum (20, 22) and the output-side cable end (36, 42) is arranged on the at least one output-side drum (28, 30).

14 Claims, 10 Drawing Sheets

(State of the art)

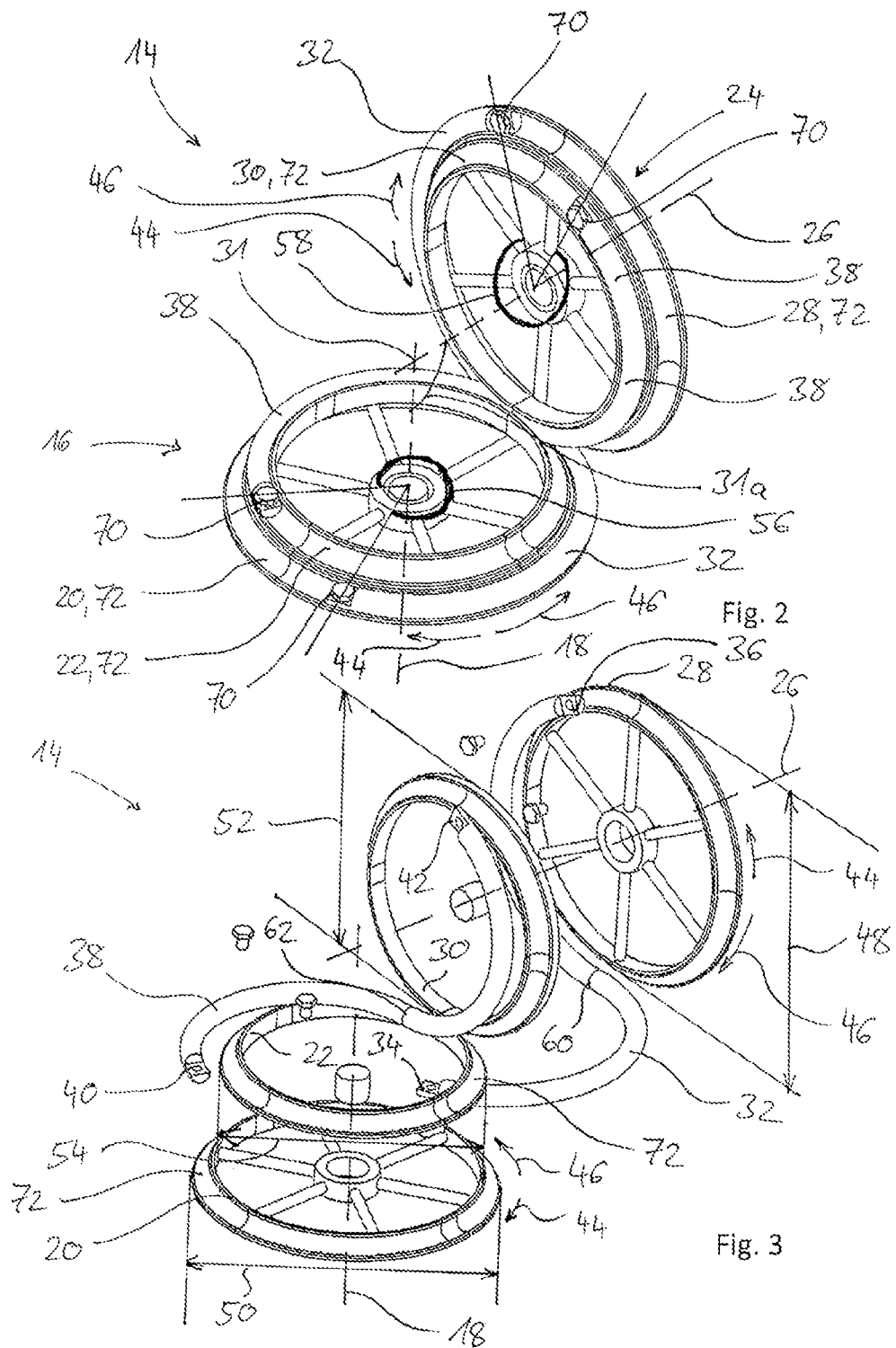

GEAR ARRANGEMENT AS WELL AS ROBOT WITH GEAR ARRANGEMENT

FIELD

Background

The invention relates to a gear arrangement as well as a robot with a gear arrangement.

Various concepts of angular gears are known for changing the orientation of the axis of rotation in mechanical drive trains. These include bevel gear stages and belt drives.

Bevel gear stages are a common gear concept for changing the orientation of the axes of rotation in, among other things, robotics. In particular, they are used to drive the axes of articulated arm robots. Bevel gear stages are, however, heavy and subject to play. Bevel gear stages have these disadvantageous properties in common with other gear drives.

Belt drives usually use belts with a trapezoidal cross-section. To change the orientation of the axis of rotation in belt drives, it is therefore traditionally necessary to twist the belt in sections about the longitudinal axis of the belt. Such a twisting of the belt requires a free section of the span in which the twisting takes place, so that correspondingly large center distances must be realized. An angular gearbox based on a belt drive therefore requires a comparatively large installation space. In addition, belt drives have relatively low rigidity compared to alternative gearbox concepts. These disadvantages make them particularly unattractive for use in robotics.

SUMMARY

The invention is based on the task of providing a gear arrangement which is suitable for changing the orientation of the axis of rotation and has a high rigidity as well as requires minimal installation space with simultaneous freedom from play and low weight. In addition, the gear arrangement should be inexpensive and easy to manufacture.

The invention is also based on the task of providing a robot that can perform highly dynamic movements, while simultaneously requiring minimal installation space and being inexpensive and easy to manufacture.

The task is solved according to the invention, by a gear arrangement in which at least one drive-side drum arranged rotatably about a drive axis, a drive output body with at least one output-side drum arranged rotatably about a drive output axis, and at least one cable which can be wound onto the at least one drive-side drum as well as onto the at least one output-side drum. A drive-side cable end is arranged on the at least one drive-side drum. and an output-side cable end is arranged on the at least one output-side drum The drive-side drum and/or the output-side drum are arranged to be rotatable relative to one another.

A gear arrangement according to the invention comprises a drive body with at least one drive-side drum arranged rotatably about a drive axis, as well as a drive output body with at least one output-side drum arranged rotatably about a drive output axis. In addition, the gear arrangement comprises at least one cable, which can be wound onto the at least one drive-side drum as well as onto the at least one output-side drum, and has a drive-side cable end as well as an output-side cable end. The drive-side cable end is arranged on the at least one drive-side drum and the output-side cable end is arranged on the at least one output-side drum.

By rotating the at least one drive-side drum about the drive axis, the rotational speed and torque can thus be transmitted to the at least one output-side drum by means of the at least one cable. In the context here and in the following, a drum is preferably understood to be a body with a basic cylindrical shape. In addition, a drum can, however, also be formed by another body which can rotate about a longitudinal axis and which is intended and/or suitable for winding the at least one cable. The angle of rotation of the at least one drive-side drum and the at least one output-side drum can, in particular, be limited by the length of the at least one cable. In the context here and in the following, a cable is preferably understood to be an elongated structure which can be subjected to tensile stress and which—in particular in contrast to a belt—has an essentially round cross-section. This means that it is preferably not necessary to twist the at least one cable to change the orientation of the axis of rotation. Furthermore, the cable can have a particularly high rigidity.

A transmission ratio of the gear arrangement can be formed by the quotient of the diameter of the at least one output-side drum and the diameter of the at least one drive-side drum. A maximum angle of rotation of the at least one output-side drum can—in addition to the length of the at least one cable—be dependent in particular on the transmission ratio. In this way, with a transmission ratio of 1, the maximum angle of rotation of the at least one output-side drum is preferably 360°. With a transmission ratio of 2, the maximum angle of rotation of the at least one output-side drum can, for example, be 180°.

Preferably, the drive body is rotatable about the drive axis together with the at least one drive-side drum. Correspondingly, the drive output body can also be rotatable about the drive output axis together with the at least one output-side drum. In particular, the drive body and/or the drive output body can be configured as a wheel.

To reset the gear arrangement, the gear arrangement can, for example, comprise a spring element which is preloaded by means of the at least one drive-side drum when rotational speed and torque are introduced into the gear arrangement. The at least one output-side drum can, in particular, be mounted against the spring element.

The at least one cable with a contact circumference is preferably simultaneously in contact with the at least one drive-side drum and the at least one output-side drum. This allows the at least one drive-side drum and the at least one output-side drum to be arranged very close to one another. This allows the installation space occupied by the gear arrangement to be reduced. The contact circumference is to be understood as an imaginary circumferential line of the cable at a position relative to the cable centerline. The contact circumference can mark the turning point of the at least one cable in contact with the at least one drive-side drum and the at least one output-side drum. With respect to the drums involved, an imaginary tangent of the at least one drive-side drum, which is arranged on the cable centerline, and an imaginary tangent of the at least one output-side drum, which is arranged on the cable centerline, can be coincident at the position of the contact circumference.

The gear arrangement can also comprise a contact area related to the cable centerline, in which the at least one cable is simultaneously in contact with the at least one drive-side drum and the at least one output-side drum, and which is limited on the one hand by a first contact circumference and on the other hand by a second contact circumference. The contact area can, in particular, form due to elastic deformation of the components involved.

The drive axis and the drive output axis can have an angular axis offset to one another. This means that the gear arrangement can be used to change the orientation of the axis of rotation in the smallest possible installation space. Preferably, the drive axis and the drive output axis intersect at a common axis intersection point. The angular axis offset between the drive axis and the drive output axis is particularly preferably 90°.

The drive-side cable end can be attached to the at least one drive-side drum and/or the output-side cable end can be attached to the at least one output-side drum in a form-fitting, frictionally engaged and/or material engaged manner. This makes it possible to realize the gear arrangement with the at least one cable with two cable ends. The use of an endless cable, which is to say a self-contained cable, can, in particular, be dispensed with. External and internal friction losses of the at least one cable can, moreover, be reduced. Preferably, the respective cable end is screwed onto the at least one drive-side drum and/or onto the at least one output-side drum.

Preferably, the at least one drive-side drum and/or the at least one output-side drum has a groove extending in the circumferential direction for receiving the at least one cable. The groove can thus form the interface between the at least one drive-side drum and/or the at least one output-side drum and the at least one cable. With the aid of the groove, the at least one cable can be accommodated on a defined circumference of the at least one drive-side drum and/or the at least one output-side drum. This ensures reliable transmission of rotational speed and torque. The groove preferably has an arc-shaped contour in cross-section. The groove can therefore comprise an opening. The curved contour particularly preferably comprises a constant radius such that the contour is configured like a circular arc. This allows the groove to be particularly well adapted to the contour of the at least one cable. Inasmuch as the groove serves to accommodate the at least one cable, the transmission ratio of the gear arrangement is preferably determined by the ratio of the diameters of the at least one output-side drum to the at least one drive-side drum.

In a further development of the invention, the groove on at least one of the at least one drive-side drum and/or the at least one output-side drum is configured with a helical shape. As a result, a maximum angle of rotation of the drum comprising the helical groove of more than 360° can be achieved. Preferably, the opening of the groove is arranged at a right angle to the axis of rotation of the corresponding drum, such that the at least one cable can be inserted into the groove at a right angle to the axis of rotation of the corresponding drum and removed from the groove. In a case of an arrangement of the helical groove on the drive-side drum, the opening of the groove is therefore preferably oriented perpendicular to the drive axis.

In one embodiment of the invention, at least one drive-side drum is arranged to be axially displaceable as a function of a drive-side angle of rotation and/or the at least one output-side drum is arranged to be axially displaceable as a function of an output-side angle of rotation. The angle of rotation of the drive-side drum is preferably referred to as the drive-side angle of rotation. Correspondingly, the angle of rotation of the output-side drum can be referred to as the output-side angle of rotation. Due to such a dependency, especially in the case of a helical groove, a transition of the at least one cable from the at least one drive-side drum to the at least one output-side drum and vice versa can take place while maintaining the contact circumference described above. The axial displaceability of the at least one drive-side drum is preferably configured in such a way that it can be displaced along the drive axis. The axial displaceability of the at least one output-side drum is preferably such that it can be displaced along the drive output axis. The axial displaceability of the at least one drive-side drum and/or the at least one output-side drum can, for example, be realized by means of a screw guidance.

To further ensure a perfect transition of at least one cable from the at least one drive-side drum to the at least one output-side drum and vice versa, a roller-shaped hold-down device can be arranged on the at least one output-side drum and/or on the at least one drive-side drum, which hold-down device can position the at least one cable in the at least one output-side drum and/or on the at least one drive-side drum.

A tensioning device for tensioning the at least one cable can be arranged on the drive body and/or on the drive output body. This allows a pretension of the at least one cable and thus, in particular, for the rigidity and play of the gear arrangement to be adjusted. Preferably, the tensioning device is arranged in the groove. The tensioning device is particularly preferably arranged on the at least one output-side drum. The tensioning device can have a tensioning screw for tensioning the at least one cable. Alternatively, the tensioning device can be integrated into the at least one cable.

In a further development of the invention, the gear arrangement has a deflection body with at least one deflecting drum rotatable about a deflection axis. The deflection body is preferably arranged such that the at least one cable with a contact circumference is simultaneously in contact with the at least one deflecting drum and the at least one drive-side drum or the at least one deflecting drum and the at least one output-side drum. Such a deflection body can multiply the possibilities of how the drive body and the drive output body can be arranged in relation to one another in space. In particular, the deflection body can enable the drive body and the drive output body to be arranged at a distance from one another. The deflection body can, moreover, represent an additional transmission stage and thus enable an increase in the transmission ratio of the gear arrangement. Provided that the drive axis and the drive output axis have an angled offset to one another, the corresponding deflection of the cable can occur by means of the deflection body. The deflection axis can include a deflection angle to the drive axis and/or the drive output axis.

In a preferred embodiment of the invention, the drive body comprises a first drive-side drum and a second drive-side drum, which each correspond to the at least one drive-side drum, and the drive output body comprises a first output-side drum and a second output-side drum, which each correspond to the at least one output-side drum. Correspondingly, the first drive-side drum and the second drive-side drum can each be arranged rotatably about the drive axis, and the first output-side drum and the second output-side drum can each be arranged rotatably about the drive output axis.

In this embodiment, the gear arrangement, moreover, has a first cable corresponding to the at least one cable as well as a second cable corresponding to the at least one cable, wherein the first cable is operatively connected to the first drums and wherein the second cable is operatively connected to the second drums. Preferably, therefore, the first cable is windable on the first drive-side drum as well as on the first output-side drum and comprises a first drive-side cable end as well as a first output-side cable end, wherein the first drive-side cable end can be arranged on the first drive-side drum and the first output-side cable end can be arranged on the first output-side drum. Correspondingly, the second cable can be windable on the second drive-side drum as well as on the second output-side drum and can comprise a second drive-side cable end as well as a second output-side cable end, wherein the second drive-side cable end can be arranged on the second drive-side drum and the second output-side cable end can be arranged on the second output-side drum.

The fact that
the first drive-side drum and the second drive-side drum respectively correspond to the at least one previously described drive-side drum,
the first output-side drum and the second output-side drum respectively correspond to the at least one previously described output-side drum,
and
the first cable and the second cable respectively correspond to the at least one previously described cable,
and thereby the first cable is operatively connected to the first drums and the second cable is operatively connected to the second drums, the gear arrangement may, in particular, comprise the features described below.

The first cable can be in contact simultaneously with the first drive-side drum and the first output-side drum with a first contact circumference. The second cable can be in contact simultaneously with the second drive-side drum and the second output-side drum with a second contact circumference. Correspondingly, the gear arrangement can also comprise a first contact area and a second contact area.

Preferably, the first drive-side cable end is attached to the first drive-side drum and/or the first output-side cable end is attached to the first output-side drum in a form-fitting, frictionally engaged and/or materially engaged manner. Correspondingly, the second drive-side cable end is preferably attached to the second drive-side drum and/or the second output-side cable end is attached to the second output-side drum in a form-fitting, frictionally engaged and/or materially engaged manner.

The first drive-side drum and/or the first output-side drum can respectively comprise a groove extending in the circumferential direction for receiving the first cable. The second drive-side drum and/or the second output-side drum can each have a groove extending in the circumferential direction for receiving the second cable. One or a plurality of the grooves can be helical.

The first drive-side drum and/or the second drive-side drum can be arranged to be axially displaceable as a function of a drive-side angle of rotation. The first output-side drum and/or the second output-side drum can be arranged to be axially displaceable as a function of an output-side angle of rotation.

The tensioning device is particularly preferably arranged on the at least one output-side drum.

The first drive-side drum can comprise a first drive-side tensioning device and the second drive-side drum can comprise a second drive-side tensioning device. Preferably, a first output-side tensioning device is arranged on the first output-side drum and a second output-side tensioning device is arranged on the second output-side drum.

The deflection body can comprise a first deflecting drum and a second deflecting drum. The first deflecting drum can be arranged in such a way that the first cable with a first contact circumference is simultaneously in contact with the first deflecting drum and the first drive-side drum or the first deflecting drum and the first output-side drum. In a corresponding manner, the second deflecting drum can be arranged in such a way that the second cable with a second contact circumference is simultaneously in contact with the second deflecting drum and the second drive-side drum or the second deflecting drum and the second output-side drum.

In addition, the invention can be configured such that at least one of the second drums is arranged axially offset relative to the corresponding first drum and/or at least one of the second drums has a different, preferably smaller, diameter than the corresponding first drum. The axial offset preferably relates to the corresponding axis of rotation. By way of example, with respect to the drive axis, the second drive-side drum can be arranged axially offset in relation to the first drive-side drum. The same can apply to the output-side drums in relation to the drive output axis and/or the deflecting drums in relation to the deflection axis. With such an arrangement, a contact-free crossing of the first cable and the second cable can be achieved, in particular in the case of an angular offset of the corresponding axes of rotation. Friction between the first cable and the second cable can thus be avoided. In particular in the case of an angular offset of the axes of rotation involved, the opening of the groove arranged on the respective drum is preferably inclined relative to the corresponding axis of rotation. In the case that the angular offset of the drive output axis relative to the drive axis is, for example, 90°, the openings of the grooves of the first drive-side drum and the second drive-side drum can each be inclined relative to the drive axis, preferably at 45°. In this case, the same can apply to the openings of the grooves of the output-side drums in relation to the drive output axis. Provided that the diameters of the second drums involved differ from those of the second drums involved, the ratios of the diameters of the first drums involved and the second drums involved are preferably constant. This means that the first drums involved and the second drums involved can have the same transmission ratios. This means that a misalignment of the gear arrangement can be avoided.

Preferably, with respect to the drive axis, the first cable and the second cable are arranged on the drive body in opposite directions and/or, with respect to the drive output axis, are arranged on the drive output body in opposite directions. Opposing rotational speeds and torques can therefore be transmitted by means of the first cable and the second cable. A spring element for resetting can therefore be dispensed with.

The drive-side drums and/or the output-side drums can be arranged to be rotatable relative to one another. For this purpose, the two drive-side drums and/or the two output-side drums can each be connected to one another by means of an adjusting screw. This allows the first cable and the second cable to be pretensioned against one another. The rotatability of the drive-side drums and/or the output-side drums relative to one another can therefore represent an alternative to the tensioning device described above. The rotation of the drive-side drums occurs preferably about the drive axis. The rotation of the output-side drums occurs preferably about the drive output axis. Particularly preferably, the drive-side drums and/or the output-side drums can also respectively be lockable against one another.

In a further development of the invention, with respect to the drive output axis, the first drive-side drum and the second drive-side drum are arranged offset by 180° relative to one another and/or with respect to the drive axis, the first output-side drum and the second output-side drum are arranged offset by 180° relative to one another. This allows for, in particular, the installation space occupied by the gear arrangement to be adapted. By arranging the drive-side drums in this way, a first transfer point, at which the first cable is transferred from the first drive-side drum to the first output-side drum, can be offset by 180°, with respect to the output axis, to a second transfer point, at which the second cable is transferred from the second drive-side drum to the second output-side drum. In a corresponding manner, an offset of 180° from the first transfer point to the second transfer point with respect to the drive axis can be realized by such an arrangement of the output-side drums. Such an offset arrangement of the drive-side drums is preferably used with a helical configuration of the grooves arranged on the drive-side drums. Such an offset arrangement of the output-side drums is preferably used with a helical configuration of the grooves arranged on the output-side drums. Such an offset arrangement of the drive-side drums or the output-side drums can, in particular, achieve an advantage as regards installation space with an angular offset of 90° between the drive axis and drive output axis. The drums offset by 180° are preferably arranged on a common shaft, which intersects the drive axis or the drive output axis when the drive axis and drive output axis are offset by 90°.

Provided that the gear arrangement comprises a deflection body, in a corresponding manner, with respect to the deflection axis, the first drive-side drum and the second drive-side drum can be arranged offset by 180° and/or, with respect to the deflection axis, the first output-side drum and the second output-side drum can be arranged offset by 180°, in particular, in the case in which the drive axis and the deflection axis and/or the drive output axis and the deflection axis are arranged offset by 90° with respect to one another.

In a further embodiment of the invention, with respect to the drive axis, the drive body is arranged between the first output-side drum and the second output-side drum and/or, with respect to the drive output axis, the drive output body is arranged between the first drive-side drum and the second drive-side drum. Such an arrangement can also achieve advantages in terms of installation space. This arrangement is preferably used if the grooves arranged on the drive-side drums and/or the output-side drums are helical and/or the drive axis and the drive output axis comprise an angular offset to one another, in particular of 90°. With respect to the drive axis, the drums of the drive body can be arranged on opposite sides of the drive body. Correspondingly, with respect to the drive output axis, the drums of the drive output body can be arranged on opposite sides of the drive output body.

In a corresponding manner, with respect to the deflection axis, the deflection body can be arranged between the first output-side drum and the second output-side drum and/or arranged between the first drive-side drum and the second drive-side drum.

A robot according to the invention comprises a gear arrangement with the features described above. The robot can comprise a base and a robot arm with a first arm section and a second arm section, wherein the second arm section is preferably arranged on the first arm section so as to be rotatable about a first articulation axis. The first arm section can be arranged on the base. Relative to the environment, the robot arm can be mounted by means of the base. The drive body can be arranged in the first arm section. Preferably, a drive unit for driving the drive body is also arranged in the first arm section. The drive output body can be arranged in the second arm section in such a way that the drive output axis lies on the first articulation axis. The drive output body can be arranged in such a way that the first cable and the second cable, with the first contact circumference and the second contact circumference, are simultaneously in contact with the corresponding drive-side drums and the corresponding output-side drums to transmit the rotational speed and the torque from the drive unit to the drive output body. The drive axis and the drive output axis can be offset to one another by 90°. With such an arrangement, the relatively heavy drive unit can be arranged in the first arm section near the base and the second arm section can have a relatively low weight. This increases the dynamics of the robot. The installation space occupied by the robot arm can, moreover, be significantly reduced.

In a further development, the robot comprises a third arm section, which is arranged on the second arm section so that it is rotatable about a second articulation axis. A second drive unit can be arranged in the second arm section, preferably close to the first articulation axis. The robot can have a second gear arrangement with the features described above, which comprises a deflection body. The drive body of the second gear arrangement is preferably arranged on the second drive unit in the second arm section. The drive output body of the second gear arrangement can be arranged on the third arm section in such a way that the drive output axis of the second gear arrangement lies on the second articulation axis. In order to transmit the rotational speed and torque from the second drive unit to the drive output body of the second gear arrangement, the deflection body can be arranged in such a way that the first cable and the second cable of the second gear arrangement are simultaneously in contact with the deflecting drums and the drive-side drums with the contact circumference of the second gear arrangement. The deflection body can, moreover, be arranged in such a way that the deflection axis lies on the first articulation axis. The drive axis of the second gear arrangement and the deflection axis of the second gear arrangement can be offset to one another by 90°. This allows the dynamics of the robot to be further increased while simultaneously reducing the installation space. Inasmuch as the second gear arrangement comprises the deflection body, it can bridge the length of the second arm section between the drive body of the second gear arrangement and the associated drive output body.

BRIEF DESCRIPTION OF THE DRAWINGS

Embodiment examples of the invention are elucidated with reference to the following figures. Wherein:

FIG. 2 shows a perspective view of the first embodiment example of a gear arrangement according to the invention, FIG. 3 shows an exploded view of the embodiment shown in FIG. 2.

DETAILED DESCRIPTION

FIG. 1b through FIG. 13 show different views of various embodiments. The same reference signs are used for identical and functionally identical parts. For the sake of clarity, not all reference signs are used in every figure.

Figures 1A, 1B:
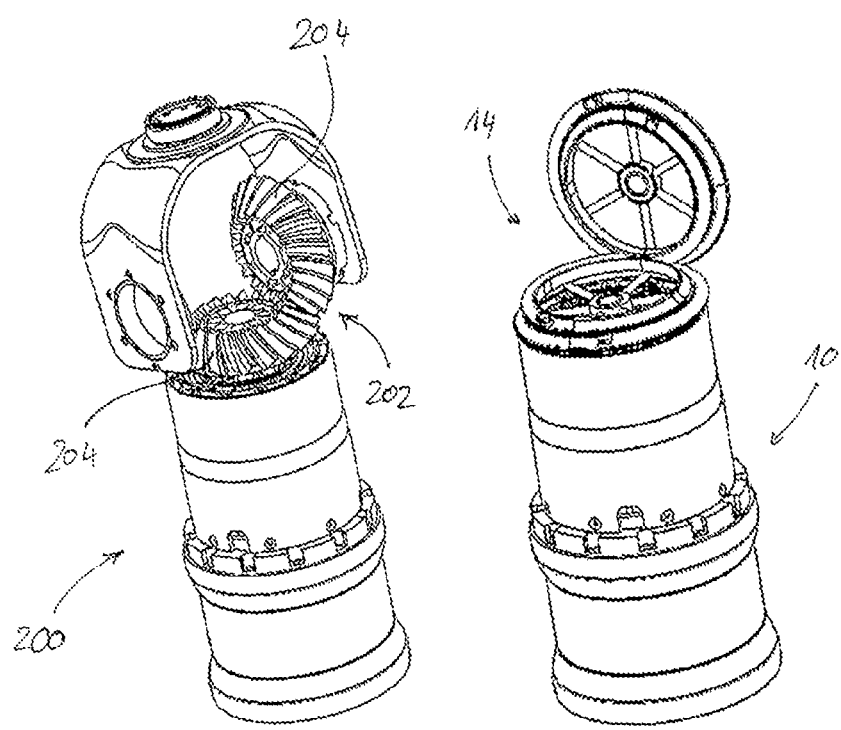
FIG. 1a shows a section of a robot arm with a gear arrangement according to the state of the art.
FIG. 1b shows a section of a robot arm with a first embodiment example of a gear arrangement according to the invention.

FIG. 1a shows a section of a robot arm 200 with a gear arrangement 202 according to the state of the art. The gear arrangement comprises cone gear wheels 204 and therefore has a relatively heavy weight and is also subject to play.

FIG. 1b contrasts the section of the robot arm 200 of the prior art shown in FIG. 1a with a section of a robot arm 10 of a robot 12 according to the invention, with a first embodiment example of a gear arrangement 14 according to the invention. The gear arrangement 14 is relatively light and also free of play.

The first embodiment example of the gear arrangement 14 is shown in detail in FIG. 2 through FIG. 5. The gear arrangement 14 comprises a drive body 16 and a drive axis 18. The drive body 16 can comprise a first drive-side drum 20 rotatably arranged about the drive axis 18 as well as a second drive-side drum 22 rotatably arranged about the drive axis 18. The gear arrangement, moreover, comprises a drive output body 24 and a drive output axis 26. The drive output body 24 can comprise a first output-side drum 28 rotatably arranged about the drive output axis 26 as well as a second output-side drum 30 rotatably arranged about the drive output axis 26. Preferably, the drive axis 18 and the drive output axis 26 intersect at a common axis intersection point 31. An angular axis offset 31a between the drive axis and the drive output axis is particularly preferably 90°.

The gear arrangement 14 can, moreover, comprise a first cable 32, which is windable on the first drive-side drum 20 as well as on the first output-side drum 28, and comprises a first drive-side cable end 34 as well as a first output-side cable end 36. Preferably, the first drive-side cable end 34 is arranged on the first drive-side drum 20 and the first output-side cable end 36 is arranged on the first output-side drum 28. The gear arrangement 14 can, moreover, comprise a second cable 38, which can be wound on the second drive-side drum 22 as well as on the second output-side drum 30, and comprise a second drive-side cable end 40 as well as a second output-side cable end 42. The second drive-side cable end 40 is, preferably, arranged on the second drive-side drum 22 and the second output-side cable end 42 is, preferably, arranged on the second output-side drum 30.

The first cable 32 and the second cable 38 are, preferably, arranged in opposite directions on the drive body 16 with respect to the drive axis 18 and in opposite directions on the drive output body 24 with respect to the drive output axis 26. Opposing rotational speeds and torques can be transmitted by means of the first cable 32 and the second cable 38.

By rotating the drive-side drums 20, 22 about the drive axis 18 in a first direction of rotation 44, the rotational speed and the torque can thus be transmitted via the first cable 32 to the first output-side drum 28 and thus to the drive output body 24. In a corresponding manner, by rotating the drive-side drums 20, 22 about the drive axis 18 in a second direction of rotation 46, the rotational speed and torque can be transmitted via the second cable 38 to the second output-side drum 30 and thus to the drive output body 24. The angle of rotation of the drive-side drums 20, 22 and the output-side drums 28, 30 can, in particular, be limited by the length of the cables 32, 38.

A transmission ratio of the gear arrangement 14 can be formed by the quotient of a first output-side drum diameter 48 of the first output-side drum 28 and a first drive-side drum diameter 50 of the first drive-side drum 20. The corresponding quotient of a second output-side drum diameter 52 of the second output-side drum 30 and a second drive-side drum diameter 54 of the second drive-side drum 22 is preferably of the same size. The embodiment example shown in FIG. 2 through FIG. 5 exhibits a transmission ratio of 1. A maximum drive-side angle of rotation 56 and a maximum output-side angle of rotation 58 are thus of the same size and are defined to be less than 360° in the embodiment example shown in FIG. 2 by the length of the cables 32, 38.

Preferably, the drive body 16 is rotatable about the drive axis 18 together with the drive-side drums 20, 22. Correspondingly, the drive output body 24 can also be rotatable about the drive output axis 26 together with the output-side drums 28, 30. The drive body 16 and the drive output body 24 can be configured as a wheel.

Figure 4:
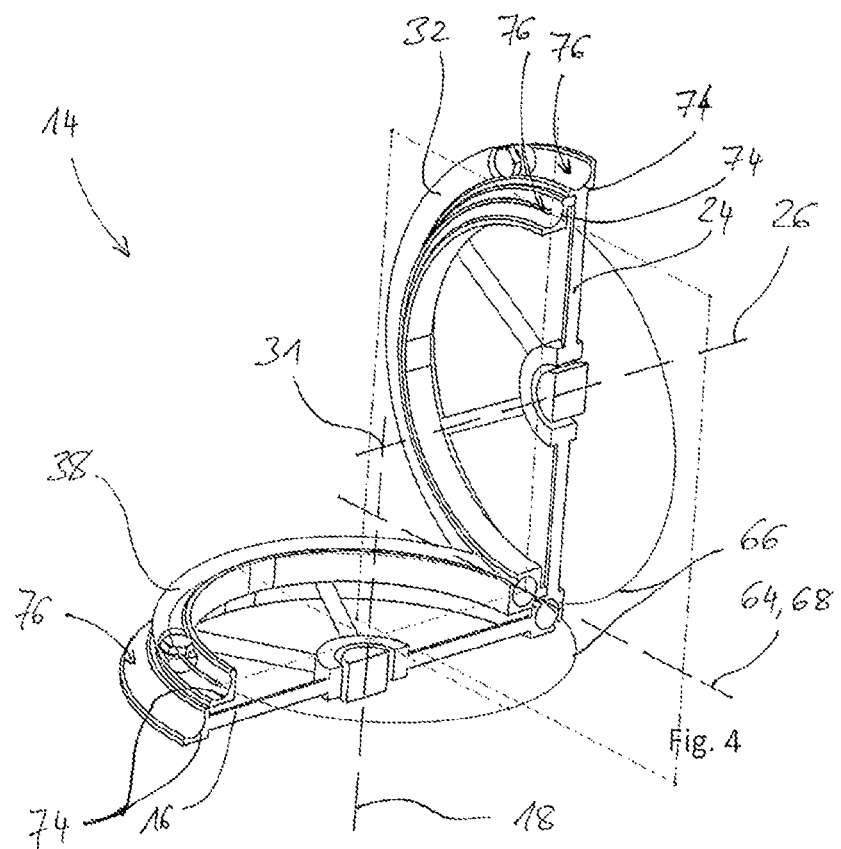
FIG. 4 shows a cross-sectional view of the embodiment example shown in FIG. 2.
Figure 5:
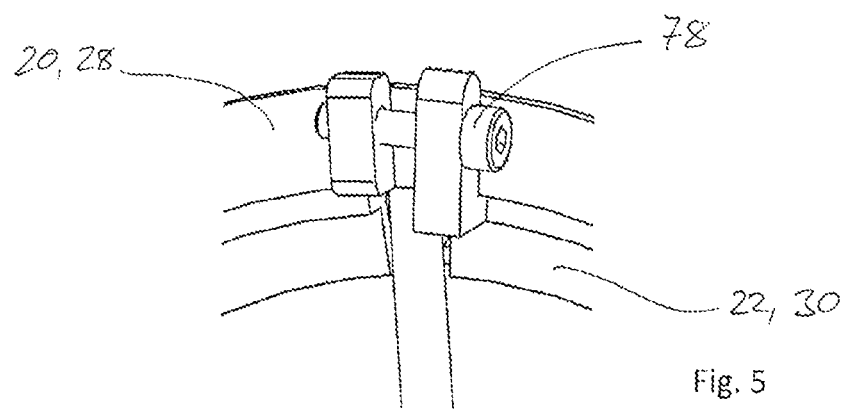
FIG. 5 shows a section of a rear view of the embodiment example shown in FIG. 2 with an adjusting screw.

The first cable 32 with a first contact circumference 60 marked in FIG. 3 and FIG. 4 is, preferably, simultaneously in contact with the first drive-side drum 20 and the first output-side drum 28. Correspondingly, the second cable 38 with a second contact circumference 62 can simultaneously be in contact with the second drive-side drum 22 and the second output-side drum 30.

The respective contact circumference 60, 62 can mark the inflection point of the corresponding cable 32, 38 adjacent to the corresponding drive-side drum 20, 22 and the corresponding output-side drum 28, 30. As shown in FIG. 4 using the example of the second drums 22, 30, an imaginary drive-side tangent 64 of the second drive-side drum 22, which is arranged on a cable centerline 66 of the second cable 38, and an imaginary output-side tangent 68 of the second output-side drum 30, which is arranged on the cable centerline 66, can be coincident at the position of the second contact circumference 62. The correlation applies correspondingly to the first contact circumference 60.

As can, in particular, be seen from FIG. 3, the drive-side cable ends 34, 40 are form-fittingly and frictionally fastened to the drive-side drums 20, 22 and the output-side cable ends 36, 42 are form-fittingly and frictionally fastened to the output-side drums 28, 30 by means of a screw connection 70.

As can be seen, in particular, from the illustration in FIG. 4, the first drive-side drum 20 and the first output-side drum 28 as well as the second drive-side drum 22 and the second output-side drum 30 can each respectively have a groove 72 running in the circumferential direction for receiving the first cable 32 or alternatively the second cable 38. The groove 72 can thereby form the interface of the first drive-side drum 20 or the first output-side drum 28 to the first cable 32 as well as the interface of the second drive-side drum 22 or the second output-side drum 30 to the second cable 38. With the aid of the groove 72, the first cable 32 and the second cable 38 can be accommodated on a defined circumference of the corresponding drive-side drums 20, 22 and the corresponding output-side drums 28, 30. As shown in FIG.

4, the groove 72 preferably comprises a curved contour 74 with a constant radius, such that the contour 74 is configured like a circular arc.

As can, in particular, be seen in FIG. 2 and FIG. 4, the gear arrangement 14 can be configured in such a way that the second drive-side drum 22 and the second output-side drum 30 are each axially offset with respect to the corresponding first drum 20, 28 and each has a different, preferably smaller, diameter than the corresponding first drum 20, 28. The axial offset of the second drive-side drum 22 and the first drive-side drum 20 preferably relates to the corresponding axis of rotation, namely the drive axis 18. Correspondingly, the axial offset of the second output-side drum and the first output-side drum 28 preferably relates to the drive output axis 26. With such an arrangement, a contact-free cross-over of the first cable 32 and the second cable 38 can be achieved, in particular with an angular axis offset 31a.

If the angular axis offset 31a is 90°, openings 76 of the grooves 72 of the first drive-side drum 20 and of the second drive-side drum 22 can each be inclined relative to the drive axis 18, preferably by 45°. The same can apply, in this case, to the openings 76 of the grooves 72 of the output-side drums 28, 30 with respect to the drive output axis 26.

The drive-side drums 20, 22 and/or the output-side drums 28, 30 can respectively be arranged to rotate relative to one another. For this purpose, the two drive-side drums 20, 22 and/or the two output-side drums 28, 30 can respectively be connected to one another by means of an adjusting screw 78 shown in FIG. 5. The adjusting screw 78 is preferably arranged on the rear side of the drive body 16 and/or drive output body 24. This allows the first cable 32 and the second cable 38 to be pretensioned against one another. The rotation of the drive-side drums 20, 22 preferably occurs about the drive axis 18. The rotation of the output-side drums 28, 30 preferably occurs about the drive output axis 26. The drive-side drums 20, 22 and/or the output-side drums 28, 30 are also, particularly preferably, lockable against one another. Locking can also be achieved by means of the adjusting screw 78.

With regard to the other embodiment examples of the gear arrangement 14 shown in FIG. 6 through FIG. 12, their differences from the first embodiment example shown in FIG. 2 through FIG. 5 will, in particular, be discussed.

Figure 6:
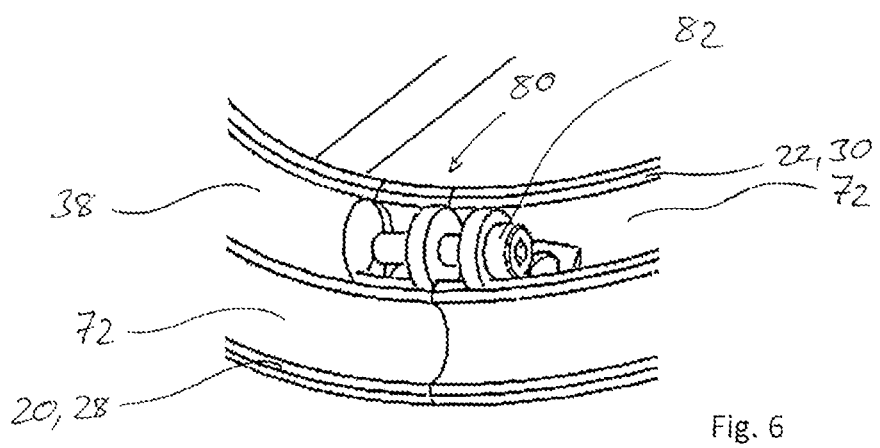
FIG. 6 shows a section out of a second embodiment example of a gear arrangement according to the invention with a tensioning device.

As shown by the section of a second embodiment example of the gear arrangement 14 illustrated in FIG. 6, instead of rotating the drive-side drums 20, 22 and/or the output-side drums 28, 30 relative to one another, the first cable 32 and/or the second cable 38 can be tensioned by means of a tensioning device 80, which can be arranged on the drive body 18 and/or on the drive output body 24. The tensioning device 80 is, preferably, arranged in the respective groove 72. Particularly preferably, one of the tensioning devices 80 is respectively arranged on the first output-side drum 28 and the second output-side drum 30. The tensioning device 80 may comprise a tensioning screw 82 for tensioning the respective cable 32, 38.

Figure 7:
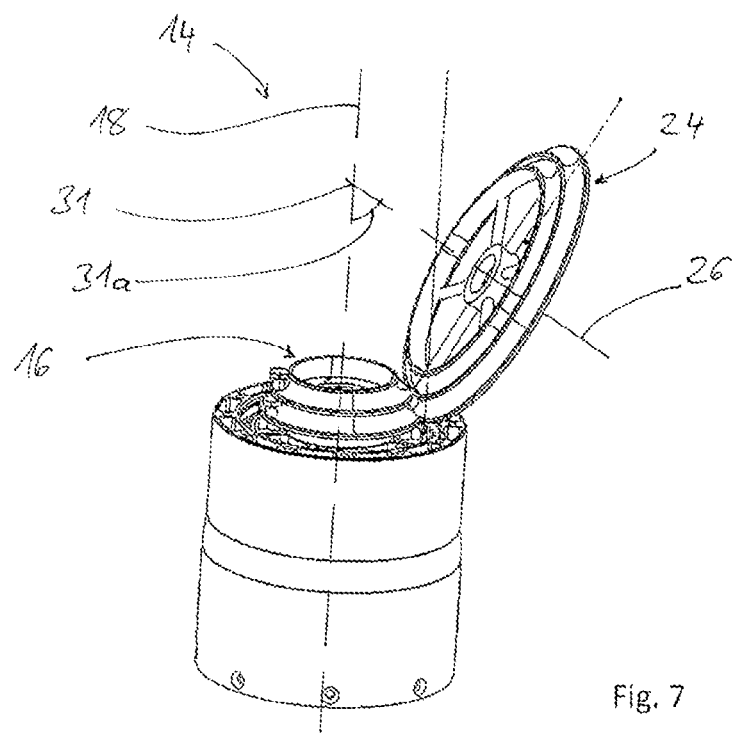
FIG. 7 shows a perspective view of a third embodiment example of a gear arrangement according to the invention.

FIG. 7 shows a third embodiment example of the gear arrangement 14, which substantially corresponds to the first embodiment example shown in FIG. 2 through FIG. 5, the angular axis offset 31a of which is 60° in contrast to the first embodiment example.

Figure 8:
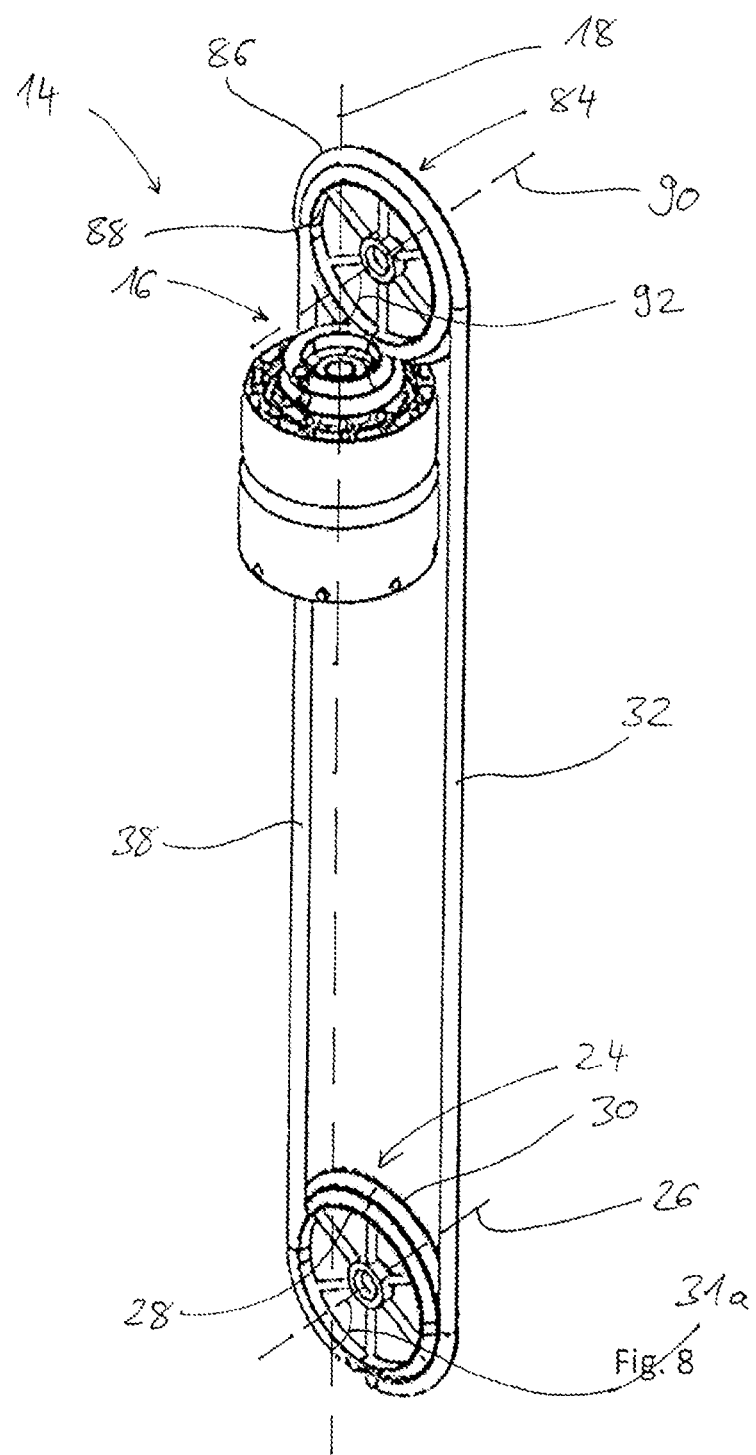
FIG. 8 shows a perspective view of a fourth embodiment example of a gear arrangement according to the invention.

In a fourth embodiment example shown in FIG. 8, the gear arrangement 14, moreover, comprises, in addition to the features of the first embodiment example of FIG. 2 through FIG. 5, a deflection body 84 with a first deflecting drum 86 and a second deflecting drum 88, which can respectively be rotatably arranged about a deflection axis 90. The first deflecting drum 86 can be arranged in such a way that the first cable 32 with the first contact circumference 60 is simultaneously in contact with the first deflecting drum 86 and the first drive-side drum 20. In a corresponding manner, the second deflecting drum 88 can be arranged in such a way that the second cable 38 with the second contact circumference 62 is simultaneously in contact with the second deflecting drum 88 and the second drive-side drum 22.

As shown in FIG. 8, the deflection body 84 can enable the drive body 16 and the drive output body 24 to be arranged at a distance from one another. Provided that the drive axis 18 and the drive output axis 26 have an angular axis offset 31a, the corresponding deflection of the cables 32, 38 can be achieved by means of the deflection body 84. The deflection axis 90 can enclose a corresponding deflection angle 92 with the drive axis 18.

According to the configuration of the drive body 16 and the drive output body 24, the second deflecting drum 88 can be arranged axially offset with respect to the first deflecting drum 86 relative to the deflection axis 90. The diameter of the second deflecting drum 88 may, likewise, differ from that of the first deflecting drum 86, preferably such that the second deflecting drum 88 has a smaller diameter than the first deflecting drum 86.

Figure 9:
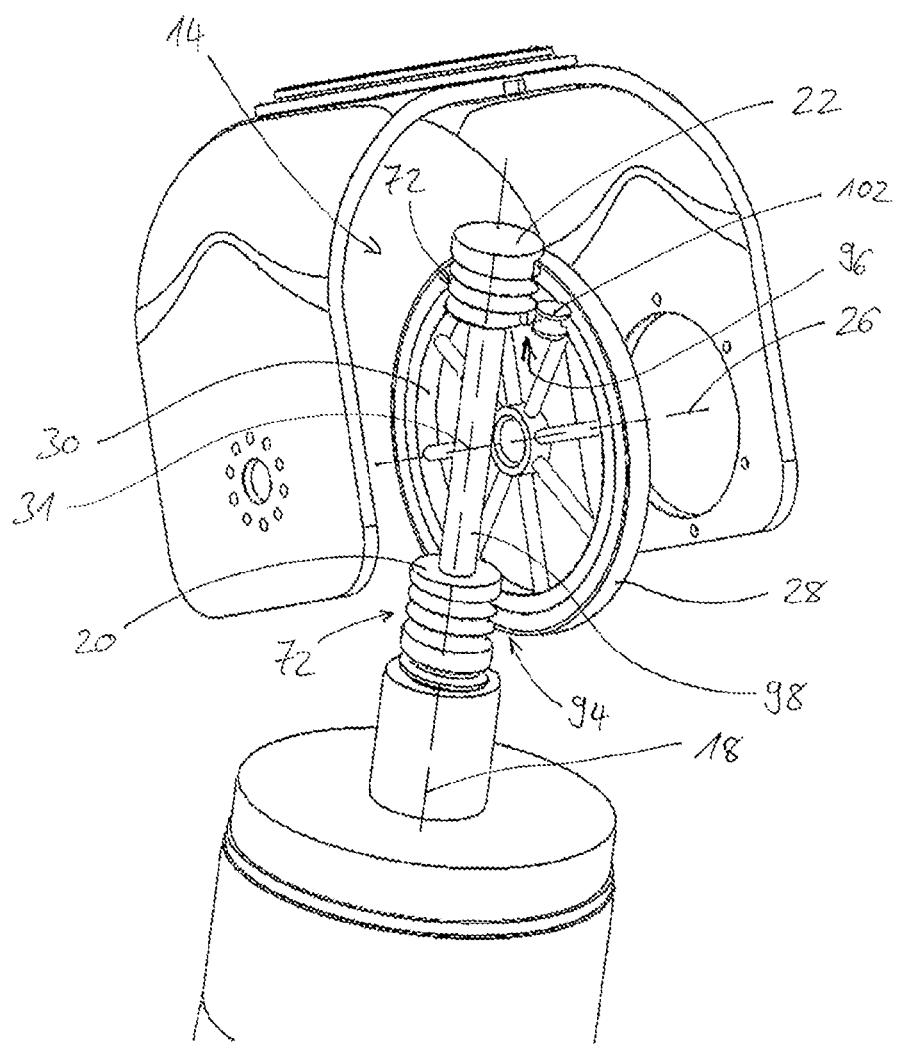
FIG. 9 shows a perspective view of a fifth embodiment example of a gear arrangement according to the invention.
Figure 10:
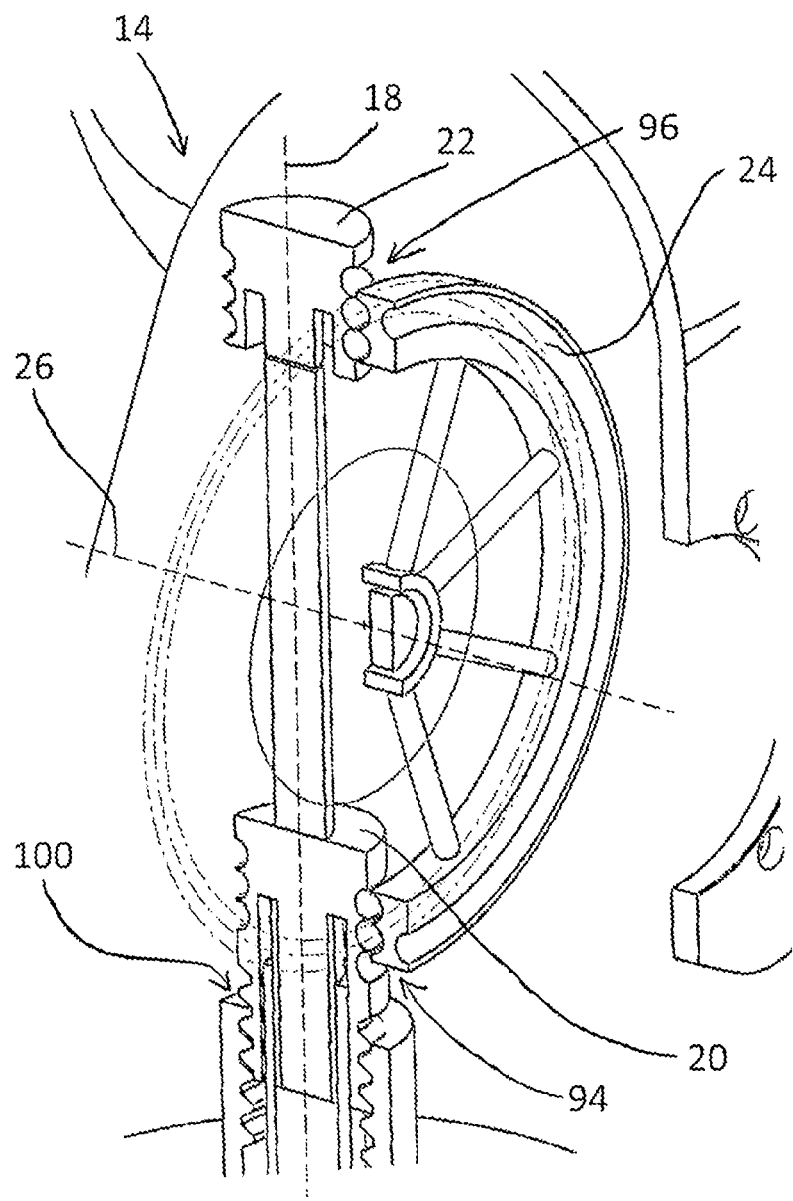
FIG. 10 shows a cross-sectional view of the embodiment example shown in FIG. 9.

FIG. 9 and FIG. 10 show a fifth embodiment example of the gear arrangement 14. In these figures, the groove 72 arranged on the first drive-side drum 20 and the second drive-side drum 22 is helical. As a result, a maximum angle of rotation of the drive-side drums 20, 22 of more than 360° can be achieved. Preferably, the opening 76 of the groove 72 is arranged at a right angle to the drive axis 18, so that the first cable 32 and the second cable 38 can be inserted into the groove 72 at a right angle to the drive axis 18 and removed from the groove 72.

In the illustrations in FIG. 9 and FIG. 10, the axis offset 31a of the drive output axis 26 to the drive axis 18 is 90°. The first drive-side drum 20 and the second drive-side drum 22 are, moreover, offset by 180° relative to the drive output axis 26. By arranging the drive-side drums in this way, a first transfer point 94, at which the first cable 32 is transferred from the first drive-side drum 20 to the first output-side drum 28, can be offset by 180°, with respect to the output axis 26, to a second transfer point 96, at which the second cable 38 is transferred from the second drive-side drum 22 to the second output-side drum 30. The first drive-side drum 20 and the second drive-side drum 22 are preferably arranged on a common drive shaft 98, which intersects the drive output axis 26.

As can be taken from the cross-sectional view in FIG. 10, dependent on a drive-side angle of rotation, the drive-side drums 20, 22 can be arranged to be displaceable axially, which is to say along the drive axis 18. Due to such a dependency, in particular in the case of a helical configuration of the groove 72, a transition of the cables 32, 38 from the drive-side drums 20, 22 to the output-side drums 28, 30 and vice versa can take place while maintaining the first contact circumference 60 and the second contact circumference 62. The axial displaceability of the drive-side drums 20, 22 can be realized by means of a screw guidance 100. To further ensure a perfect transition of the cables 32, 38 from the drive-side drums 20, 22 to the output-side drums 28, 30 and vice versa, a roller-shaped hold-down device 102 can respectively be arranged on the first output-side drum 28 and on the second output-side drum 30, which hold-down device can position the first cable 32 and the second cable 38 in the corresponding output-side drum 28, 30.

Figure 11:
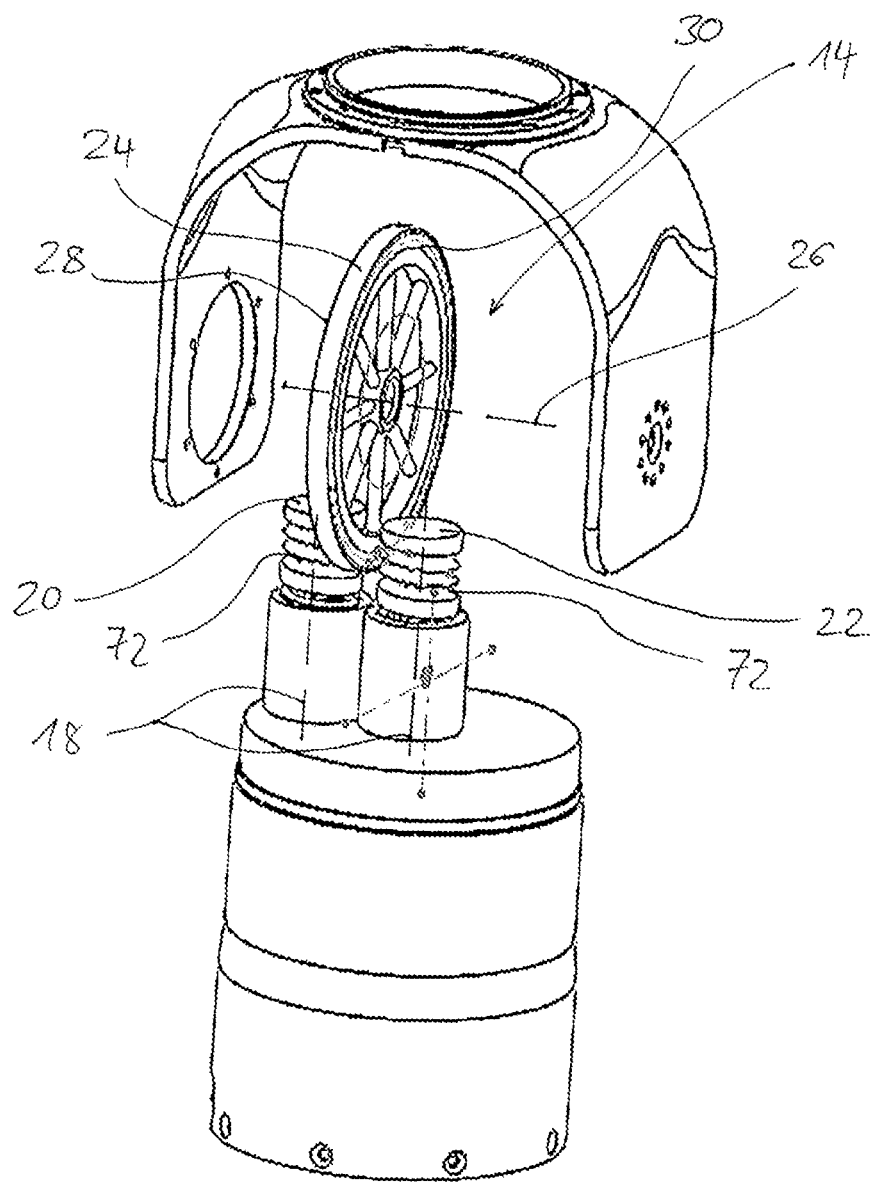
FIG. 11 shows a perspective view of a sixth embodiment example of a gear arrangement according to the invention.
Figure 12:
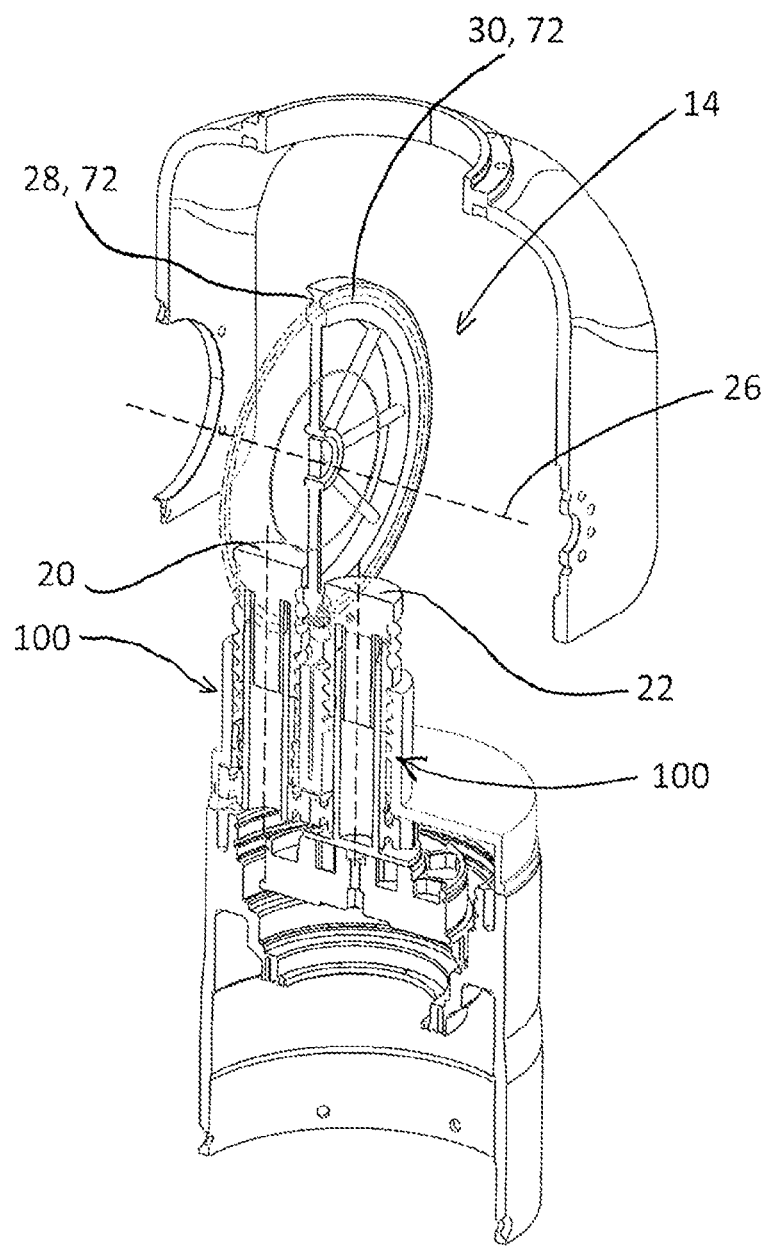
FIG. 12 shows a cross-sectional view of the embodiment example shown in FIG. 11.

The sixth embodiment of the gear arrangement 14 shown in FIG. 11 and FIG. 12 differs from that shown in FIG. 9 and FIG. 10 primarily in that, with respect to the drive output axis 26, the drive output body 24 is preferably arranged between the first drive-side drum 20 and the second drive-side drum 22. The drums of the drive output body 24 can be arranged, with respect to the drive axis 26, on opposite sides of the drive output body 24.

Figure 13:
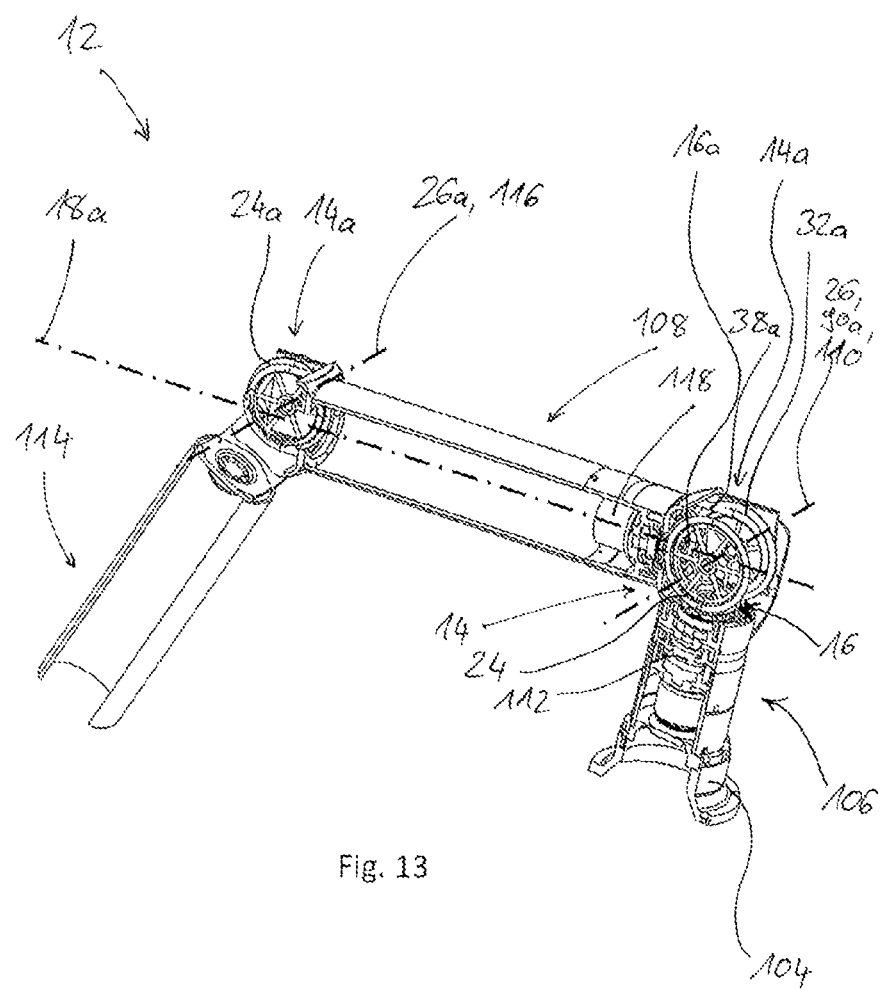
FIG. 13 shows a cross-sectional view of an embodiment example of a robot according to the invention.

FIG. 13 shows an embodiment example of a robot 12 with a gear arrangement 14. The robot 12 can comprise a base 104 and a robot arm with a first arm section 106 and a second arm section 108, wherein the second arm section 108 is preferably arranged on the first arm section 106 so as to be rotatable about a first articulation axis 110. The first arm section 106 can be arranged on the base 104. Relative to the environment, the robot arm 10 can be mounted by means of the base 104. The drive body 16 can be arranged in the first arm section 106. A drive unit 112 for driving the drive body 16 is also, preferably, arranged in the first arm section 106.

The drive output body 24 can be arranged in the second arm section 108 such that the drive output axis 18 lies on the first articulation axis 110. The drive output body 16 can be arranged in such a way that the first cable 32 and the second cable 38, with the first contact circumference 60 and the second contact circumference 62, are simultaneously in contact with the corresponding drive-side drums 20, 22 and the corresponding output-side drums 28, 30 to transmit the rotational speed and the torque from the drive unit 112 to the drive output body 16. The drive axis 18 and the drive output axis 26 can have an axis offset 31a of 90° to one another. Such an arrangement allows the relatively heavy drive unit 112 to be arranged in the first arm section 106 that is near the base.

The robot 12 may comprise a third arm section 114, which is arranged on the second arm section 108 so that it is rotatable about a second articulation axis 116. A second drive unit 118 can be arranged in the second arm section 109, preferably close to the first articulation axis 110. The robot may have a second gear arrangement 14a comprising a deflection body 84a. A second drive body 16a of the second gear arrangement 14a is preferably arranged in the second arm section 108 at the second drive unit 118. A second drive output body 24a of the second gear arrangement 14a may be arranged on the third arm section 114 such that a second drive output axis 26a is located on the second articulation axis 116. In order to transmit the rotational speed and torque from the second drive unit 118 to the second drive output body 24a, the deflection body 84a can be arranged in such a way that a first cable 32a of the second gear arrangement 14a and a second cable 38a of the second gear arrangement 14a with corresponding contact circumferences are simultaneously in contact with the deflection body 84a and the second drive body 16a. The deflection body 84a may further be arranged such that a deflection axis 90a of the second gear arrangement 14a lies on the first articulation axis 110. A drive axis 18a of the second gear arrangement 14a and the deflection axis 90a can have an offset of 90° to one another. Inasmuch as the second gear arrangement 14a comprises the deflection body 84a, it can bridge the length of the second arm section 108 between the second drive body 16a and the associated second drive output body 24a.

LIST OF REFERENCE SIGNS 10 robot arm
12 robot
14 gear arrangement
14a second gear arrangement
16 drive body
16a second drive body
18 drive axis
18a drive axis of the second gear arrangement
20 first drive-side drum
22 second drive-side drum
24 drive output body
24a second drive output body
26 drive output axis
26a second drive output axis
28 first output-side drum
30 second output-side drum
31 axis intersection point
31a axis offset
32 first cable
32a first cable of the second gear arrangement
34 first drive-side cable end
36 first output-side cable end
38 second cable
38a second cable of the second gear arrangement
40 second drive-side cable end
42 second output-side cable end
44 first direction of rotation
46 second direction of rotation
48 first output-side drum diameter
50 first drive-side drum diameter
52 second output-side drum diameter
54 second drive-side drum diameter
56 maximum drive-side angle of rotation
58 maximum output-side angle of rotation
60 first contact circumference
62 second contact circumference
64 drive-side tangent
66 cable centerline
68 output-side tangent
70 screw connection
72 groove
74 contour
76 opening
78 adjusting screw
80 tensioning device
82 tensioning screw
84 deflection body
84a deflection body of the second gear arrangement
86 first deflecting drum
88 second deflecting drum
90 deflection axis
90a deflection axis of the second gear arrangement
92 deflection angle
94 first transfer point
96 second transfer point
98 drive shaft
100 screw guidance
102 hold-down device
104 base
106 first arm section
108 second arm section
110 first articulation axis
112 drive unit
114 third arm section
116 second articulation axis
118 second drive unit
200 robot arm (state of the art)
202 gear arrangement (state of the art)
204 Cone gear wheel

The invention claimed is:

1. A gear arrangement (14, 14a) comprising:
   a drive body (16, 16a) with at least two drive-side drums (20, 22) arranged rotatably about a drive axis (18, 18a);
   a drive output body (24, 24a) with at least two output-side drums (28, 30) arranged rotatably about a drive output axis (26, 26a);
   at least two cables operatively connected to respective ones of the drive side drums and output side drums, each cable having a drive-side cable end (34, 40) as well as an output-side cable end (36, 42);
   the drive-side cable end (34, 40) on each of said cables arranged on respective ones of the drive-side drums (20, 22) and the output-side cable end (36, 42) on each of said cables arranged on respective ones of the one output-side drums (28, 30),
   the drive body (16, 16a) comprising at least two drive side drums (20, 22), the drive output body (24, 24a) comprises at least two output side drums (28, 30),
   the gear arrangement (14, 14a) comprising at least two cables operatively connected to respective ones of the drive side drums and output side drums, and
   the drive-side drum (20, 22) and/or the output-side drum (28, 30) arranged to be rotatable relative to one another.

2. Gear arrangement according to claim 1, characterized in that
   at least one cable (32, 38) with a contact circumference (60, 62) is simultaneously in contact with at least one drive-side drum (20, 22) and the at least one output-side drum (28, 30).

3. Gear arrangement according to claim 1, characterized in that
   the drive axis (18, 18a) and the drive output axis (26, 26a) have an angled axis offset (31a) to one another.

4. Gear arrangement according to claim 1, characterized in that
   the drive-side cable end (34, 40) is attached to the at least one drive-side drum (20, 22) and/or the output-side cable end (36, 42) is attached to the at least one output-side drum (28, 30) by frictional engagement and/or material engagement, in a form-fitting manner.

5. Gear arrangement according to claim 1, characterized in that
   at least one drive-side drum (20, 22) or output-side drum (28, 30) has a groove (72) extending in the circumferential direction for receiving the at least one cable (32, 38).

6. Gear arrangement according to claim 5, characterized in that
   the groove (72) on at least one drive-side drum (20, 22) or one output-side drum (28, 30) is configured with a helical shape.

7. Gear arrangement according to claim 1, characterized in that
   at least one drive-side drum (20, 22) is arranged to be axially displaceable as a function of a drive-side angle of rotation or at least one output-side drum (28, 30) is arranged to be axially displaceable as a function of an output-side angle of rotation.

8. Gear arrangement according to claim 1, characterized in that
   a tensioning device (80) for tensioning the at least one cable (32, 38) is arranged on the drive body (16, 16a) and/or on the drive output body (24, 24a).

9. Gear arrangement according to claim 1, characterized in that
   a deflection body (84, 84a) with at least one deflecting drum (86, 88) rotatable about a deflection axis (90, 90a) is arranged in such a way that the at least one cable (32, 38) with a contact circumference (60, 62) is simultaneously in contact with the at least one deflecting drum (86, 88) and at least one drive-side drum (20, 22) or the at least one deflecting drum (86, 88) and-the at least one output-side drum (28, 30).

10. Gear arrangement according to claim 1, characterized in that
    at least one of the drums (22, 30, 88) is arranged axially offset relative to different drum (20, 28, 86) and/or at least one of the drums (22, 30, 88) has a different diameter than the other drum (20, 28, 86).

11. Gear arrangement according to claim 1, characterized in that
    with respect to the drive axis (18, 18a), said at least two cables (38) are arranged on the drive body (16, 16a) in opposite directions and/or with respect to the drive output axis (26, 26a), on the drive output body (24, 24a) in opposite directions.

12. Gear arrangement according to claim 1, characterized in that
    with respect to the drive output axis (26, 26a), the respective drums (22) are arranged offset by 180° relative to one another and/or with respect to the drive axis (18, 18a) the output side drums (30) are arranged offset by 180° relative to one another.

13. Gear arrangement according claim 1, characterized in that
    the drive output body (24, 24a) comprises at least two at least two drive side drums (20, 22) and at least two output side drums (28, 30), and
    with respect to the drive axis (18, 18a), the drive body (16, 16a) is arranged between a first output-side drum (28) and a second output-side drum (30) and/or, with respect to the drive output axis (26, 26a), the drive output body (24, 24a) is arranged between the first drive-side drum (20) and the second drive-side drum (22).

14. A robot (12) with a gear arrangement (14, 14a) according to claim 1.

* * * * *